United States Patent [19]

Doyle et al.

[11] Patent Number: 4,707,880

[45] Date of Patent: Nov. 24, 1987

[54] SWIVEL CASTER ASSEMBLY AND METHOD OF MAKING

[75] Inventors: Michael P. Doyle, Stratford; Francis J. Forte, Huntington; Edward Galkowski, Shelton, all of Conn.

[73] Assignee: Stewart-Warner Corporation, Chicago, Ill.

[21] Appl. No.: 836,127

[22] Filed: Mar. 4, 1986

[51] Int. Cl.⁴ .............................................. B60B 33/00
[52] U.S. Cl. .......................................... 16/38; 16/21; 411/531; 411/535; 29/522 A
[58] Field of Search ........................................ 16/37–38, 16/18 R, 21, 22, 48; 411/531, 535–538; 29/522 A, 522 R, 509; 403/257, 261, 278, 282

[56] References Cited

U.S. PATENT DOCUMENTS

| 264,095 | 9/1882 | Merriman | 16/37 |
| 1,367,301 | 2/1921 | Chesnutt | 16/21 |
| 2,219,423 | 10/1940 | Kurtz | 411/537 X |
| 2,971,211 | 2/1961 | Kramcsak | 16/21 |
| 2,976,562 | 3/1961 | Black | 16/21 |
| 2,986,767 | 6/1961 | Rice et al. | 16/21 |
| 3,228,089 | 1/1966 | Turner | 16/21 X |

FOREIGN PATENT DOCUMENTS 140602 11/1980 Japan .
34506 4/1981 Japan .

Primary Examiner—Nicholas P. Godici
Assistant Examiner—Carmine Cuda
Attorney, Agent, or Firm—A. G. Douvas; D. V. Allen

[57] ABSTRACT

A heavy-duty caster assembly with a pintle and swivel plate mounted on top of a wheel carrying horn that minimizes pintle bending and breaking with the addition of a powdered metal washer around the pintle locked on top of the swivel plate.

12 Claims, 9 Drawing Figures

SWIVEL CASTER ASSEMBLY AND METHOD OF MAKING

BACKGROUND OF THE INVENTION

Swivel-type casters have been provided in industrial environments for many years to movably support a variety of equipment, such as material handling carts and work tables. Frequently this type of swivel caster includes a pintle which is an upwardly extending shaft that fits through a complementary female recess in the equipment to be supported. The pintle absorbs the bending loads placed on the caster assembly by the supported equipment.

Some swivel casters are pintleless in the sense that the caster is attached to the supporting equipment by fastening a swivel plate directly to the equipment being supported. In this case the swivel plate itself absorbs the torque loads applied by the equipment to the caster assembly. Such a design has the disadvantage that the fasteners connecting the swivel plate to the supported equipment are under very high loads and also the strength of the swivel plate limits the caster's load capacity. The addition of a pintle not only permits easier removal of the caster assembly from the supported equipment more readily than the swivel plate attachment type, but also increases overall caster strength since the pintle absorbs a significant portion of the bending loads applied to the caster by the supported equipment.

The most difficult problem in these pintle and swivel plate type casters is mounting the pintle in a way to resist bending loads to minimize bending and breaking of the pintle. One attempt to solve this problem has been to provide a bottom plate underneath the horn to which the end of the pintle is staked. In this arrangement the pintle is radially supported at two spaced locations, one in a central aperture in the swivel plate, and the other in a through bore in the bottom plate. However, since the bottom plate is usually radially supported by roller bearings there is no rigid radial support provided by the bottom plate and hence the single aperture in the swivel plate, which is a relatively thin member, has frequently been found to be inadequate to withstand the bending forces applied by the equipment to the pintle and the pintle fails.

Another problem in the pintle-swivel plate type caster is that sometimes the pintle itself is bent slightly during formation and cannot be straightened during assembly into the caster and thus must be rejected.

It is the primary object of the present invention to ameliorate the problems noted above in heavy-duty swivel type casters.

SUMMARY OF THE PRESENT INVENTION

In accordance with the present invention, a swivel caster of the type described above is provided with a powdered metal washer around the pintle that conforms to and locks in the top of the swivel plate to provide additional radial support for the pintle in the swivel plate, all accomplished without modifying the swivel plate, the bearings, the horn or the bottom plate.

The caster includes a standard swivel plate with a semi-torroidal recess for ball bearings seated between the swivel plate and the horn which has a complementary bearing recess. Since the swivel plate is a stamping this bearing recess appears as a semi-torroidal annular protrusion on top of the swivel plate. According to the present invention the powdered metal bearing is formed with an outer semi-torroidal surface approximately the same shape of the semi-torroidal protrusion on top of the swivel plate.

Manufacturing errors, however, cause inconsistencies in the location and curvature of the annular protrusion on the swivel plate so that the shape of the semi-torroidal surface on the washer can only approximate or average those on the swivel plate. An important aspect of the present invention is that after manufacture, the powdered metal washer conforms exactly, or nearly exactly, to the upper protrusion on the swivel plate top even with errors in the swivel plate. The washer snugly fits around the pintle and it has an axial length of over 5/16" to provide radial support for the pintle in addition to that provided by the standard swivel plate aperture support and the bottom plate support, and it virtually eliminates pintle bending and breaking.

This washer mounting is achieved by a unique method also in accordance with the present invention. As noted above the washer has a semi-torroidal outer surface located and shaped identical to the average distribution of the same parameters on the swivel plate. In assembly the washer is initially placed over the pintle and then the pintle is placed through the aligned apertures in the swivel plate and the horn, and then the bottom plate is slid over the lower end of the pintle. Thereafter the lower end of the pintle is staked over the bottom plate drawing the pintle downwardly, compressing and deforming the powdered metal washer on the swivel plate semi-torroidal surface and as this happens the washer fills in any space between the washer and the swivel plate to firmly positively lock the washer radially as well as axially with respect to the swivel plate. This method also straightens minor bends in the pintle caused prior to assembly.

Other objects and advantages of the present invention will appear from the following description.

DETAILED DESCRIPTION OF THE PREFERRED EMBODIMENT

Figure 1:
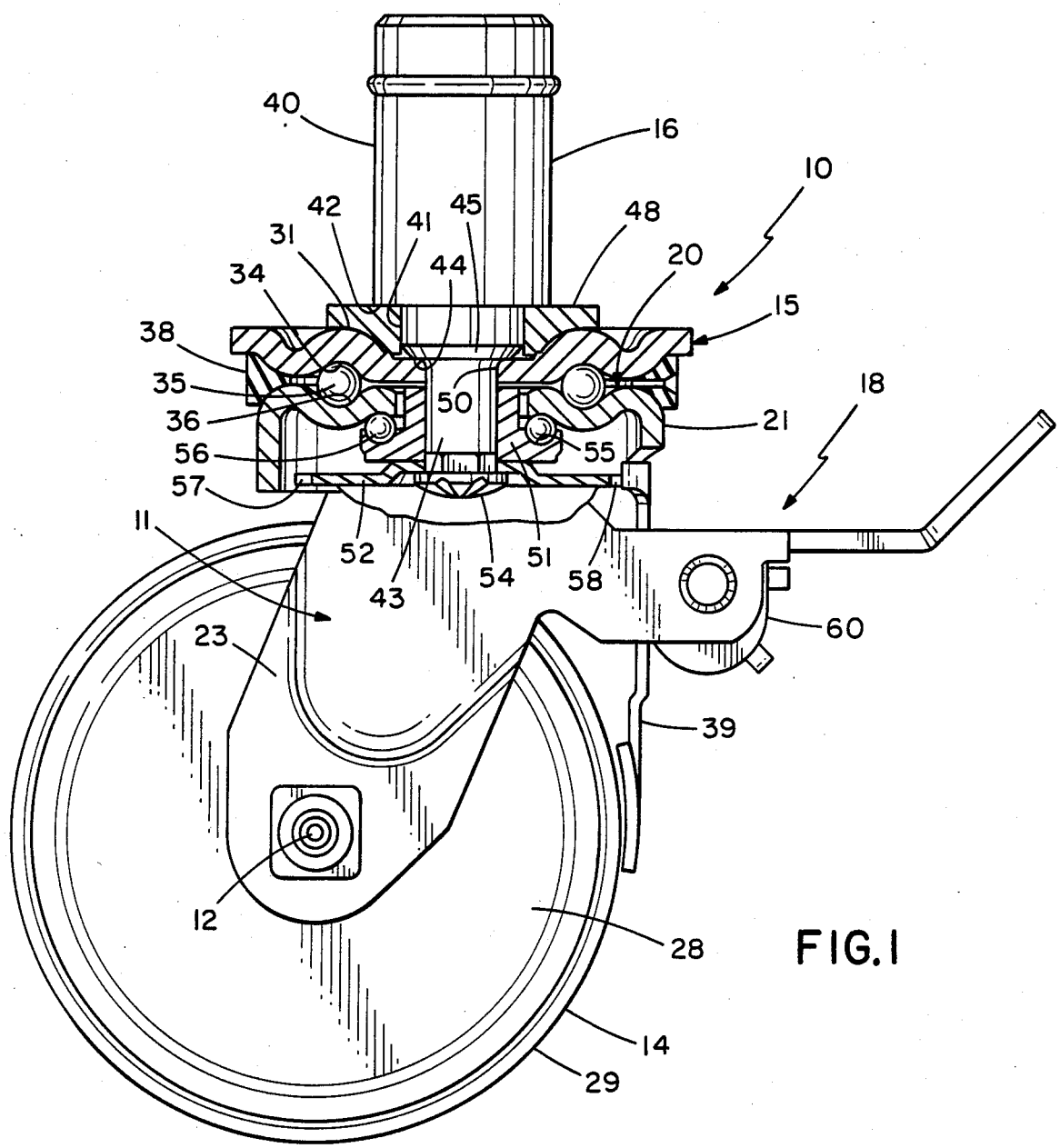
FIG. 1 is a side view of a swivel caster according to the present invention with the swivel plate and upper horn area shown in longitudinal section.

Referring to the drawings and particularly FIG. 1, the present swivel caster 10 is illustrated consisting generally of a U-shaped horn 11 carrying an axle 12 that supports a wheel 14 for rotation, with a freely rotatable rectangular swivel plate 15 on its upper surface. Swivel plate 15 has a stepped pintle 16 therethrough that is adapted to fit into a complementary female bushing on the underside of the equipment to be supported. With the pintle 16 fixed to the supported article, the horn 11 and wheel 14 are free to pivot about the vertical axis of the pintle 16 to increase the maneuverability of the equipment, which of course is supported by several of the caster assemblies 10.

A swivel lock and brake assembly 18 is provided for substantially simultaneously locking the horn 11 from movement with respect to the swivel plate 15 and preventing rotation of the wheel 14 in either direction.

The horn 11 is constructed of a ferrous metal and has a top portion 20 with an annularly depending flange 21 connected to spaced parallel side legs 23. The lower ends of the legs 23 have apertures that receive axle 12 fastened in position by threaded nuts.

Wheel 14 is rotatably mounted on the axle 12 and includes a metal hub 28 with an outer thread 29 of a somewhat resilient plastic material, such as polyurethane, molded directly to the periphery thereof.

The swivel plate 15 is a rectangular member constructed of a ferrous metal, but it should be understood that it may as well be circular in outer configuration. The swivel plate 15 has a stamped upper semi-torroidal ridge or projection 31 defining a semi-torroidal recess 34 that forms one race for a plurality of ball bearings 35 also seated in a similar facing stamped semi-torroidal recess 36 disposed centrally in the top portion 20 of horn 11.

The space between the swivel plate 15 and the top portion 20 of the horn is sealed by and lubricated through a plastic seal and lube ring 38 that is described in detail in the Frank Fontana U.S. Pat. No. 4,348,784, assigned to the assignee of the present invention.

The swivel plate 15 is axially fixed to the horn by the pintle 16 that includes an enlarged cylindrical upper portion 40, a first reduced portion 41 defining a shoulder 42, and a smaller second reduced portion 43 defining a shoulder 44 that has a chamfered portion 45.

The first reduced portion 41 on the pintle extends through radial locking washer 48 (see FIGS. 2 and 3), and the lower stem portion 43 extends through and is snugly fitted through central aperture 50 in the swivel plate 15, through lower or bottom thrust member 51 and through a swivel lock plate 52 against which the lower end of the pin 16 is staked as shown at 54. Thrust or bottom member 51 has a semi-torroidal recess 55 in its upper surface that receives ball bearings 56 engaging the lower surface of the horn top portion 20 to axially lock, with bearings 35, the swivel plate 15 to the horn top portion 20 in both directions while permitting free rotational movement thereof.

The swivel lock plate 52 forms part of the swivel lock and brake assembly 18. Plate 52 has a hexagonal central opening that is snugly seated on a complementary lower end of the pin 16, preventing rotation of the lock plate 52 with respect to the swivel plate 15.

The lock plate 52 has a plurality of scalloped recesses 57 about its periphery formed in a single stamping operation defining an annular array of teeth 58. The swivel lock and brake assembly 18 also includes a generally vertical swivel lock and brake member 39 reciprocably and pivotally mounted on horn 11, a pivotal cam actuator 60 for shifting the swivel lock and brake member against the lock plate 52 and wheel 14, and a return spring (not shown) for assisting and disengaging or releasing the swivel lock and brake member 39.

The washer 48 according to the present invention is a powdered metal washer, preferably of the ferrous type, and in one embodiment found acceptable contains the following; 2% Cu., 0.8% C., balance Fe., constructed of a fine grain powder. Exemplary washer 48 dimensions are 2.25" OD, 1.24" ID, 0.350" axial thickness.

Figures 2, 3:
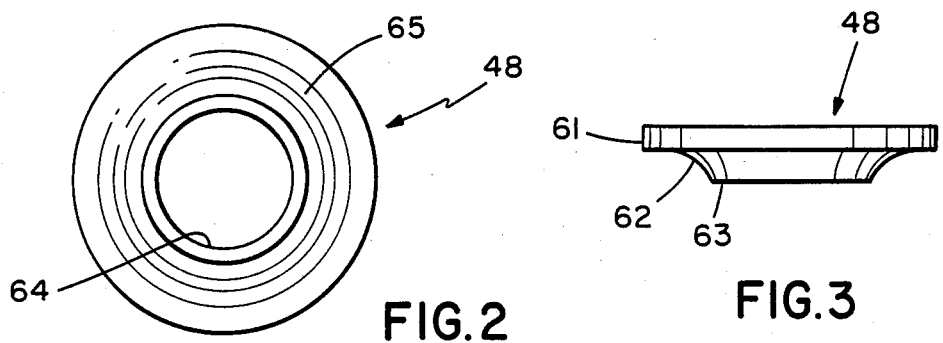
FIG. 2 is a subassembly bottom view of a powdered metal washer illustrated on top of the swivel plate in FIG. 1.
FIG. 3 is a side view of the powdered metal washer illustrated in FIG. 2.

Important aspects of the present invention are the ability of the washer 48 to accommodate slightly out of tolerance swivel plates 15 and to correct for slight bends in the pintles. Toward this end and as seen in FIGS. 2 and 3, the washer 48 includes a flat top surface 65 cylindrical side wall 61, a semi-torroidal outer surface 62, a flat bottom surface 63, and a central bore 64 that is sized to be snugly received on reduced pintle portion 41.

Figure 4:
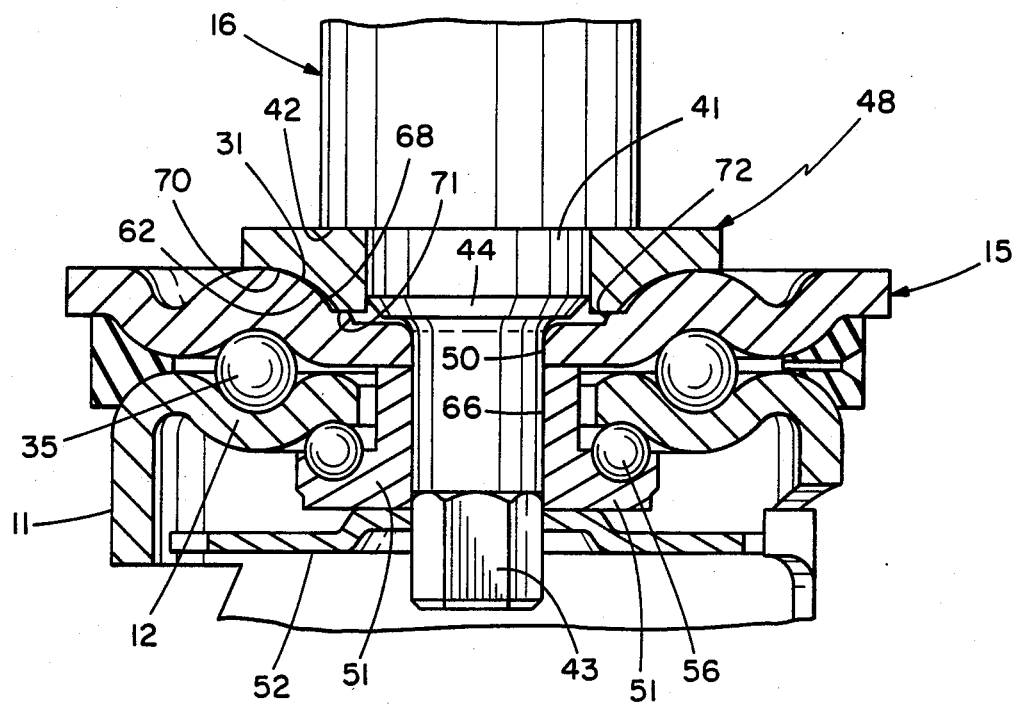
FIG. 4 is a longitudinal fragmentary section of the upper horn and swivel plate assembly prior to pintle staking.
Figure 5:
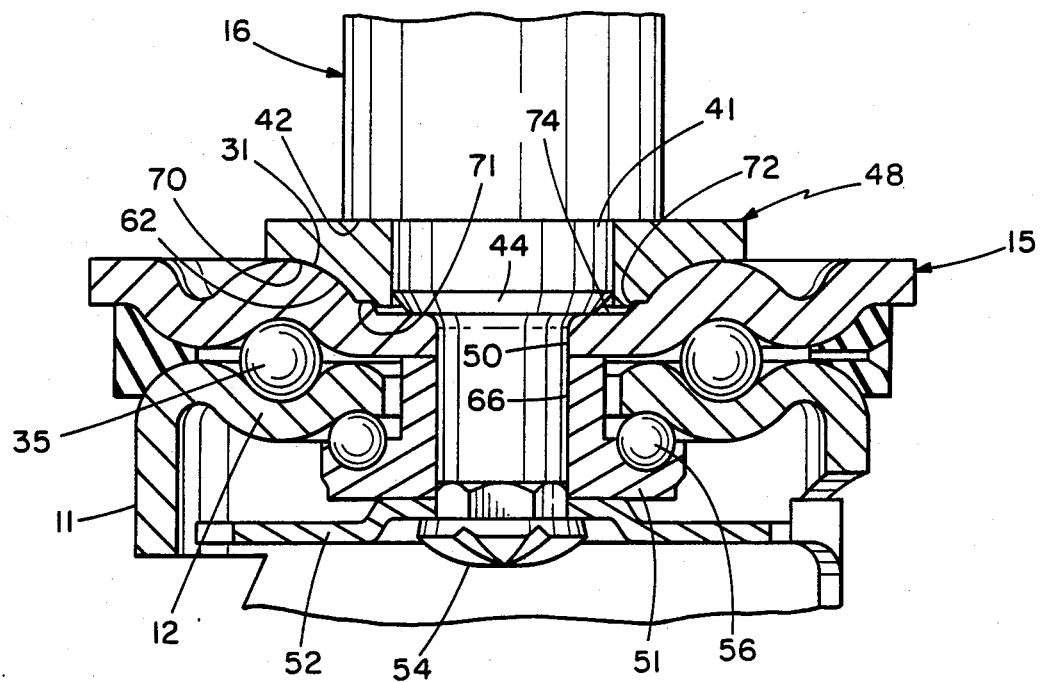
FIG. 5 is a longitudinal fragmentary section similar to FIG. 4 after pintle staking.

The general method of assembly and as seen in FIG. 4 includes placing the washer 48 on the reduced pintle portion 41 and then extending the assembled pintle through the central aperture 50 in the swivel plate 15 through central bore 66, placing the lower thrust member 51 and the swivel lock plate 52 over the lower end of the reduced pintle portion 43 and then staking as at 54 in FIG. 5 the end of the pintle over the swivel lock plate 52 locking the pintle, the swivel plate 15, the lower thrust member 51 and the swivel lock plate 52 together as a unit. The assembly is shown in FIG. 4 in an intermediate stage prior to staking. The particular swivel plate 15 illustrated in FIG. 4 has a smaller than normal radius on its upper protrusion 31 creating a significant space 68 between the washer 48 and the swivel plate 15 although it engages at points 70 and 71, the latter being on an annular wall 72 on the swivel plate inwardly of the annular protrusion 31. Annular wall 72 serves to initially center the washer 48 and pintle 16 prior to staking.

During the staking operation and as seen in FIG. 5, as the pintle 16 is drawn downwardly its shoulder 42 presses washer 48 downwardly, deforming washer surface 62 into the space 68, resulting in complete conformity between the upper surface of the swivel plate and the lower surface of the washer 48. This drawing and pressing continues until pintle shoulder 44 engages upper surface portion 74 on the swivel plate 15.

Figure 6:
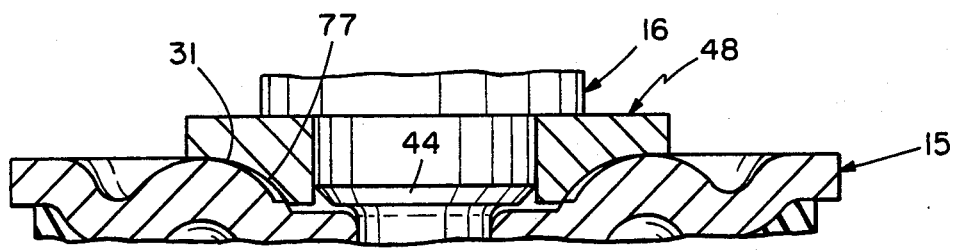
FIG. 6 is a another fragmentary longitudinal section of the upper horn swivel plate assembly prior to pintle staking with a slightly different swivel plate.
Figure 7:
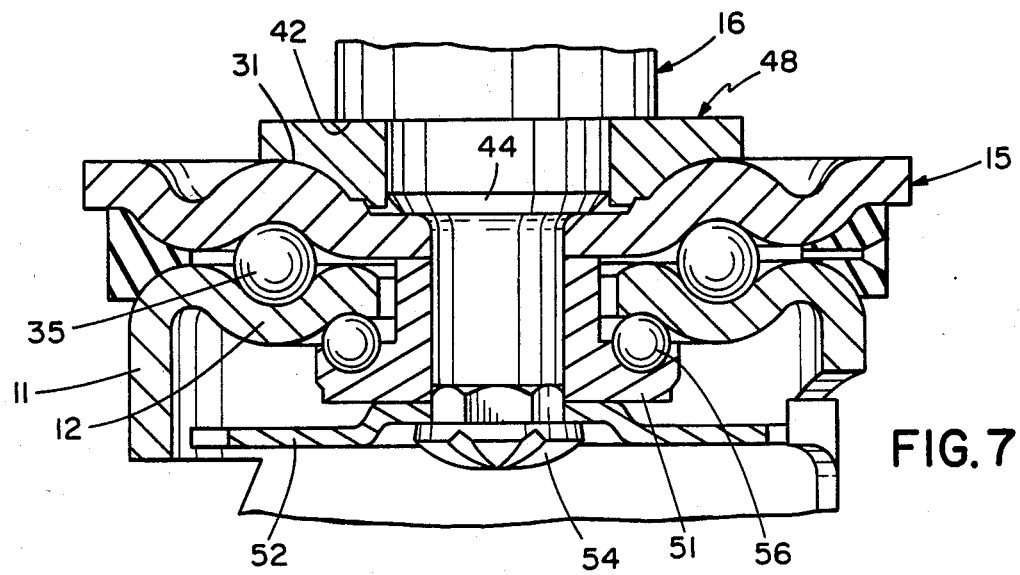
FIG. 7 is a longitudinal fragmentary view of the FIG. 6 swivel plate after pintle staking.
Figure 8:
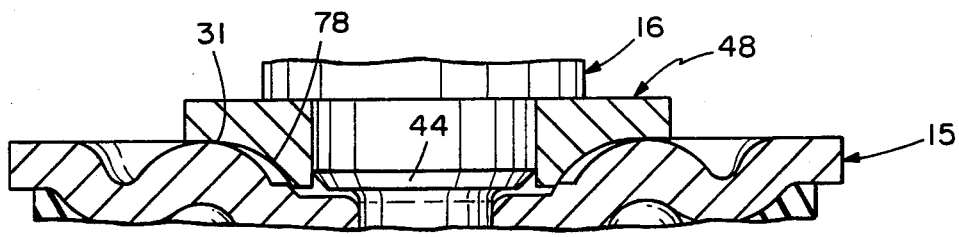
FIG. 8 is a fragmentary longitudinal section of the pintle and swivel plate prior to staking with still another slightly different swivel plate configuration.
Figure 9:
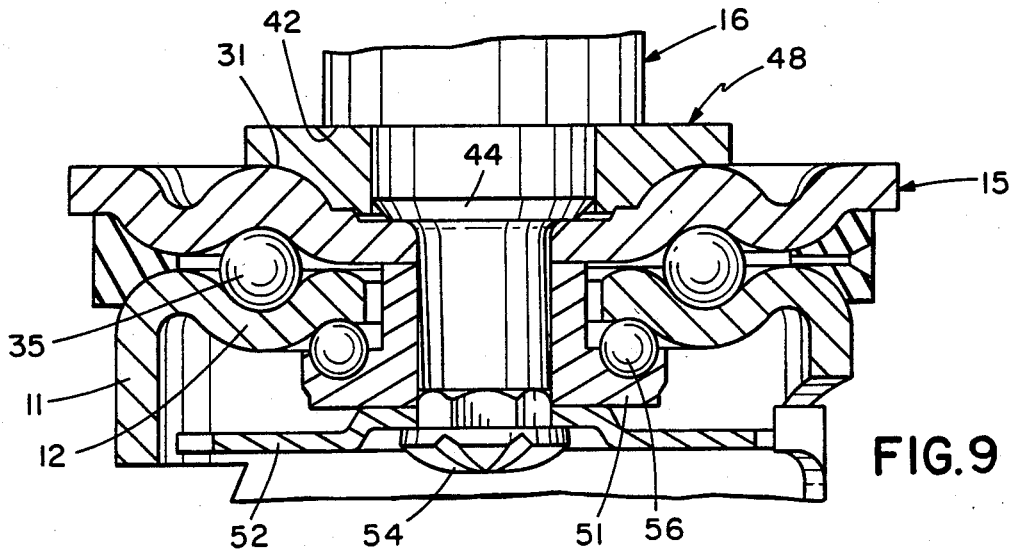
FIG. 9 is a fragmentary longitudinal section of the swivel plate illustrated in FIG. 8 after pintle staking.

In FIG. 6, the swivel plate 15 has a protrusion 31 with a much larger radius than the FIG. 4 plate and prior to assembly leaves a relatively small space 77 between the washer and the swivel plate that is closed during the staking operation by deforming the washer 48 to the configuration shown in FIG. 7. The swivel plate 15 shown in FIG. 8 has a protrusion 31 with a radius approximately between the radius of the swivel plate in FIG. 4 and the swivel plate in FIG. 6, and in this embodiment also the space 78 between the washer 48 and the swivel plate 15 is closed during the staking operation as seen in FIG. 9.

What is claimed is:

1. A method of making a heavy duty swivel caster assembly of the type having a wheel supporting horn on which a swivel plate is rotatably mounted by an upwardly extending pintle, including the steps of; forming the swivel plate with a central aperture therein and an annular upper surface portion, forming a pintle with a downwardly facing shoulder, forming a deformable annular washer sized to fit within and engage the swivel plate annular upper surface portion and placing it on the pintle in engagement with the pintle shoulder, pressing the pintle downwardly in the swivel plate aperture with sufficient force to deform the washer against the annular surface portion to radially lock the washer against the swivel plate, and attaching the pintle, washer and swivel plate to the horn.

2. A method of making a heavy duty swivel caster assembly as defined in claim 1, wherein the steps of pressing the pintle and attaching the pintle, washer and swivel plate to the horn member are effected simultaneously.

3. A method of making a heavy duty swivel caster assembly as defined in claim 1, including the step of forming a lower plate adapted to fit over the pintle, forming the horn with an opening adapted to receive the pintle and placing the pintle through that opening, placing the lower plate over the lower end of the pintle, said step of attaching the pintle, washer, and swivel plate to the horn including staking the lower end of the pintle against the lower plate drawing the pintle downwardly and effecting the pintle pressing step as the attaching step is effected.

4. A method of making a heavy duty swivel caster assembly as defined in claim 1, wherein the steps of forming the washer include forming the washer of a powdered metal material.

5. A method of making a heavy duty swivel caster assembly as defined in claim 4, wherein the steps of forming the washer include forming the washer of an iron powdered metal material.

6. A method of making a heavy duty swivel caster assembly of the type having a wheel supporting horn on which a swivel plate is mounted by an upwardly extending shaft, the steps of; forming the swivel plate with a central aperture therein and an annular upper surface portion, forming a shaft with a downwardly facing shoulder, forming a deformable annular washer sized to fit within and engage the swivel plate annular upper surface portion and placing it on the shaft in engagement with the shaft shoulder, pressing the shaft downwardly in the swivel plate aperture with sufficient force to deform the washer against the annular surface portion to radially lock the washer against the swivel plate, and attaching the shaft, washer and swivel plate to the horn.

7. A method of making a heavy duty swivel caster assembly of the type having a wheel supporting horn on which a swivel plate is rotatably mounted by an upwardly extending pintle, including the steps of: forming a wheel carrying horn having an upper aperture therethrough and an annular downwardly projecting bearing race portion, forming a swivel plate having a central aperture therethrough and an annular upwardly projecting bearing race portion sized to mate with the horn bearing race portion, forming a pintle with a first reduced portion and a smaller lower second reduced portion sized to just fit within the swivel plate aperture, forming a powdered metal deformable washer with an annular portion curved in cross section sized to engage the swivel plate bearing race portion and with a central aperture having a diameter substantially equal to the pintle first reduced portion, placing the washer over the pintle on the first reduced portion thereof, inserting the pintle with the washer into the central apertures of the swivel plate and horn and placing a bottom plate over the lower projecting end of the second reduced portion of the pintle, and pressing the pintle downwardly to deform the washer annular portion in conformity to the swivel plate annular portion to radially lock the washer with respect to the swivel plate and to compensate for manufacturing errors in the swivel plate, and attaching the pintle, washer, swivel plate and bottom plate together as a unit.

8. A method of making a heavy duty swivel caster assembly as defined in claim 7, wherein the attaching step for the pintle, washer, swivel plate and bottom plate and the pressing step for the pintle are effected simultaneously by staking the pintle second reduced portion to the bottom plate.

9. A method of making a heavy duty swivel caster assembly as defined in claim 7, wherein the first and second reduced portions on the pintle define first and second pintle shoulders, said first pintle shoulder engaging the washer during the pintle pressing step and the second pintle shoulder engaging the swivel plate to stop the pintle pressing step.

10. A swivel plate type caster, comprising: a "U" shaped horn adapted to carry a wheel including an upper aperture therein, a swivel plate rotatably mounted on top of the horn and having an annular surface projecting sharply upwardly from its upper surface and having a central aperture therein, shaft means extending through the central aperture in the swivel plate and the horn to axially lock them together while permitting relative rotational movement, and a deformable powdered metal washer deformed by force pressing the washer against the swivel plate annular surface between the shaft means and the swivel plate annular surface to radially lock the shaft means with respect to the swivel plate even with minor inaccuracies in swivel plate manufacture.

11. A swivel plate and pintle caster, comprising: a "U" shaped horn adapted to carry a wheel and having a central aperture at the upper end thereof, said horn having an annular bearing recess therein, a swivel plate rotatably mounted on top of the horn and having a central aperture therein and an annular bearing receiving recess that defines an annular sharply upwardly extending projection, a pintle extending through the central apertures in the swivel plate and the horn for rotatably mounting the swivel plate to the horn, and a powdered metal washer deformed by force pressing the washer against the swivel plate closely fitted around the pintle and engaging the swivel plate annular sharply upwardly extending projection to radially lock the pintle with respect to the swivel plate.

12. A swivel plate and pintle caster, comprising: a "U" shaped horn adapted to carry a wheel and having a central aperture at the upper end thereof, said horn having an annular bearing recess therein, a swivel plate rotatably mounted on top of the horn and having a central aperture therein and an annular bearing receiving recess that defines an annular upwardly extending projection, a pintle extending through the central apertures in the swivel plate and the horn for rotatably mounting the swivel plate to the horn, said pintle having a first reduced portion extending above the swivel plate defining an upper shoulder and smaller second reduced portion extending through the central apertures in the swivel plate and the horn defining a lower shoulder engaging the upper surface of the swivel plate, a powdered metal washer closely fitted around the first reduced portion of the pintle and having an annular surface portion curved in cross section engaging and conforming to the annular swivel plate projection to radially lock the pintle with respect to the swivel plate, said washer having an axial length less than the first reduced portion on the pintle so that the upper shoulder on the pintle engages the washer and axially clamps it against the swivel plate, and a bottom plate over the second reduced portion of the pintle, said pintle being staked to the bottom plate to hold the pintle, washer, swivel plate and bottom plate together as a unit.

* * * * *